US012538355B2

(12) United States Patent
Yang et al.

(10) Patent No.: US 12,538,355 B2
(45) Date of Patent: *Jan. 27, 2026

(54) MULTIPLE STARTING AND ENDING POSITIONS FOR SCHEDULED OR AUTONOMOUS UPLINK TRANSMISSION IN UNLICENSED SPECTRUM

(71) Applicant: Telefonaktiebolaget LM Ericsson (publ), Stockholm (SE)

(72) Inventors: Yu Yang, Solna (SE); Reem Karaki, Aachen (DE); Havish Koorapaty, Saratoga, CA (US); Jung-Fu Cheng, Fremont, CA (US); Sorour Falahati, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,388

(22) Filed: Jul. 11, 2023

(65) Prior Publication Data

US 2023/0354423 A1 Nov. 2, 2023

Related U.S. Application Data

(63) Continuation of application No. 17/484,474, filed on Sep. 24, 2021, now Pat. No. 11,729,826, which is a
(Continued)

(51) Int. Cl.
*H04W 74/0808* (2024.01)
*H04L 1/00* (2006.01)
(Continued)

(52) U.S. Cl.
CPC ....... *H04W 74/0808* (2013.01); *H04L 1/0003* (2013.01); *H04L 5/0082* (2013.01);
(Continued)

(58) Field of Classification Search
CPC ............. H04W 74/0808; H04W 16/14; H04W 72/0446; H04W 72/12; H04W 72/1268;
(Continued)

(56) References Cited

U.S. PATENT DOCUMENTS

| 7,091,830 B2 | 8/2006 | Anderson et al. |
| 7,562,390 B1 | 7/2009 | Kwan |

(Continued)

FOREIGN PATENT DOCUMENTS

| CN | 104796232 A | 7/2015 |
| CN | 105230109 A | 1/2016 |

(Continued)

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.3.0, 3GPP Organizational Partners, Sep. 2014, 124 pages.

(Continued)

*Primary Examiner* — Jael M Ulysse
(74) *Attorney, Agent, or Firm* — Withrow & Terranova, PLLC

(57) ABSTRACT

A method of operating a wireless communication device comprises identifying a first start position for performing uplink (UL) transmission in unlicensed spectrum during a first transmission time interval, performing UL transmission in the first transmission time interval (TTI) according to the first start position, identifying a second start position for performing UL transmission in unlicensed spectrum during a second TTI, wherein the first and second start positions correspond to different symbol offsets within the respective first and second TTIs, and performing UL transmission in the second TTI according to the second start position.

20 Claims, 16 Drawing Sheets

Related U.S. Application Data continuation of application No. 16/474,072, filed as application No. PCT/IB2018/052006 on Mar. 23, 2018, now Pat. No. 11,172,505.

(60) Provisional application No. 62/479,973, filed on Mar. 31, 2017, provisional application No. 62/476,553, filed on Mar. 24, 2017, provisional application No. 62/476,491, filed on Mar. 24, 2017.

(51) Int. Cl.
| | |
|---|---|
| *H04L 5/00* | (2006.01) |
| *H04W 16/14* | (2009.01) |
| *H04W 72/0446* | (2023.01) |
| *H04W 72/12* | (2023.01) |
| *H04W 72/1268* | (2023.01) |
| *H04W 74/0816* | (2024.01) |
| *H04W 76/27* | (2018.01) |

(52) U.S. Cl.
CPC ....... *H04W 16/14* (2013.01); *H04W 72/0446* (2013.01); *H04W 72/12* (2013.01); *H04W 72/1268* (2013.01); *H04W 74/0816* (2013.01); *H04W 76/27* (2018.02)

(58) Field of Classification Search
CPC .............. H04W 74/0816; H04W 76/27; H04L 1/0003; H04L 5/0082
See application file for complete search history.

(56) References Cited

U.S. PATENT DOCUMENTS

| | | | |
|---|---|---|---|
| 7,920,544 | B2 | 4/2011 | Soliman et al. |
| 10,349,401 | B2 | 7/2019 | Cheng et al. |
| 10,470,166 | B2 * | 11/2019 | Cheng ................... H04W 72/20 |
| 10,630,518 | B2 | 4/2020 | Park et al. |
| 10,742,562 | B2 | 8/2020 | Si et al. |
| 10,805,953 | B2 | 10/2020 | Babaei et al. |
| 11,032,839 | B2 * | 6/2021 | Ke ......................... H04W 72/21 |
| 11,172,505 | B2 * | 11/2021 | Yang ..................... H04L 5/0082 |
| 11,729,826 | B2 * | 8/2023 | Yang ..................... H04L 1/0003 370/336 |
| 2004/0086053 | A1 | 5/2004 | Anderson et al. |
| 2012/0014349 | A1 | 1/2012 | Chung et al. |
| 2012/0213196 | A1 | 8/2012 | Chung et al. |
| 2013/0028138 | A1 * | 1/2013 | Hao ....................... H04L 5/0092 370/254 |
| 2013/0235768 | A1 * | 9/2013 | Earnshaw .......... H04W 72/0446 370/280 |
| 2014/0314031 | A1 * | 10/2014 | Kim ...................... H04W 72/20 370/329 |
| 2015/0245323 | A1 * | 8/2015 | You ...................... H04L 5/0053 370/329 |
| 2015/0271798 | A1 * | 9/2015 | Chen ..................... H04L 1/1887 370/329 |
| 2015/0341921 | A1 * | 11/2015 | Chen ................. H04W 72/1268 370/330 |
| 2016/0095137 | A1 * | 3/2016 | Chen ..................... H04L 5/0078 370/329 |
| 2016/0135185 | A1 | 5/2016 | Chandrasekhar et al. |
| 2016/0182209 | A1 * | 6/2016 | Li ......................... H04L 5/1469 370/329 |
| 2016/0218836 | A1 * | 7/2016 | Yamamoto ............ H04W 72/21 |
| 2016/0278048 | A1 * | 9/2016 | Nory ..................... H04L 1/1812 |
| 2016/0278049 | A1 * | 9/2016 | Nory ..................... H04L 1/1896 |
| 2016/0345345 | A1 | 11/2016 | Malik et al. |
| 2016/0360525 | A1 | 12/2016 | Cheng et al. |
| 2017/0019909 | A1 * | 1/2017 | Si .......................... H04W 16/14 |
| 2017/0027002 | A1 * | 1/2017 | Yerramalli ........ H04W 74/0816 |
| 2017/0041805 | A1 * | 2/2017 | Chandrasekhar ..... H04L 1/1896 |
| 2017/0042805 | A1 | 2/2017 | Goldberg |
| 2017/0202022 | A1 * | 7/2017 | Chendamarai Kannan ................. H04W 72/23 |
| 2017/0222749 | A1 * | 8/2017 | Dinan ................... H04L 5/0051 |
| 2017/0223672 | A1 * | 8/2017 | Dinan ................. H04L 27/0006 |
| 2017/0230838 | A1 * | 8/2017 | Yerramalli ............ H04W 16/14 |
| 2017/0231006 | A1 | 8/2017 | Yin et al. |
| 2017/0290008 | A1 * | 10/2017 | Tooher ................... H04W 72/23 |
| 2017/0290040 | A1 * | 10/2017 | Dinan ................. H04L 27/0006 |
| 2017/0325225 | A1 * | 11/2017 | Dinan ................... H04W 16/14 |
| 2017/0332358 | A1 * | 11/2017 | Park ....................... H04W 72/23 |
| 2017/0359815 | A1 * | 12/2017 | Chendamarai Kannan ................. H04W 72/21 |
| 2018/0076942 | A1 * | 3/2018 | Nory ................... H04W 52/346 |
| 2018/0077721 | A1 * | 3/2018 | Nory ................. H04W 72/0466 |
| 2018/0103504 | A1 * | 4/2018 | Quan ..................... H04W 52/02 |
| 2018/0115347 | A1 * | 4/2018 | Yerramalli .......... H04W 74/004 |
| 2018/0205534 | A1 * | 7/2018 | Yi ......................... H04W 72/044 |
| 2018/0219649 | A1 * | 8/2018 | Ying ...................... H04W 76/27 |
| 2018/0227936 | A1 * | 8/2018 | Yerramalli .......... H04L 27/2662 |
| 2018/0242283 | A1 * | 8/2018 | Feng ........................ H04L 5/001 |
| 2018/0242389 | A1 * | 8/2018 | Phuyal ................... H04L 1/1812 |
| 2018/0317255 | A1 * | 11/2018 | Um ....................... H04W 16/18 |
| 2018/0332478 | A1 * | 11/2018 | Noh ....................... H04L 5/0051 |
| 2019/0007972 | A1 | 1/2019 | Gou et al. |
| 2019/0150170 | A1 * | 5/2019 | Park ....................... H04W 74/08 370/329 |
| 2019/0150184 | A1 | 5/2019 | Golitschek Edler von Elbwart et al. |
| 2019/0289635 | A1 | 9/2019 | Wang et al. |
| 2019/0335496 | A1 * | 10/2019 | Li ........................... H04L 1/1887 |
| 2019/0373560 | A1 * | 12/2019 | Ouchi .................... H04W 72/23 |
| 2019/0379487 | A1 | 12/2019 | Hwang et al. |
| 2019/0387543 | A1 | 12/2019 | Karaki et al. |
| 2020/0053782 | A1 | 2/2020 | Zhang et al. |
| 2020/0067651 | A1 | 2/2020 | Takeda et al. |
| 2020/0100286 | A1 | 3/2020 | Xu et al. |
| 2020/0127798 | A1 | 4/2020 | Yang et al. |
| 2020/0186312 | A1 * | 6/2020 | Mochizuki ........ H04W 72/0446 |
| 2020/0187249 | A1 | 6/2020 | Yang et al. |
| 2020/0205076 | A1 | 6/2020 | Loehr et al. |
| 2020/0235898 | A1 | 7/2020 | Loehr et al. |
| 2020/0266922 | A1 | 8/2020 | Zhang et al. |
| 2020/0322990 | A1 | 10/2020 | Liu et al. |
| 2020/0337083 | A1 | 10/2020 | Loehr et al. |
| 2020/0344819 | A1 | 10/2020 | Myung et al. |
| 2020/0404708 | A1 | 12/2020 | Zhang et al. |
| 2021/0067308 | A1 | 3/2021 | Ly et al. |
| 2021/0160919 | A1 | 5/2021 | Wang et al. |
| 2024/0204929 | A1 * | 6/2024 | Fehrenbach .......... H04L 5/0007 |

FOREIGN PATENT DOCUMENTS

| | | |
|---|---|---|
| CN | 105307276 A | 2/2016 |
| CN | 105309033 A | 2/2016 |
| CN | 105451341 A | 3/2016 |
| CN | 105636233 A | 6/2016 |
| CN | 106537995 A | 3/2017 |
| EP | 3131223 A1 | 2/2017 |
| EP | 3131225 A1 | 2/2017 |
| RU | 2479138 C2 | 4/2013 |
| WO | 2015042594 A2 | 3/2015 |
| WO | 2016074250 A1 | 5/2016 |
| WO | 2016092492 A1 | 6/2016 |
| WO | 2016146210 A1 | 9/2016 |
| WO | 2016148634 A2 | 9/2016 |
| WO | 2017049560 A1 | 3/2017 |
| WO | 2017207043 A1 | 12/2017 |
| WO | 2018059412 A1 | 4/2018 |
| WO | 2018173005 A1 | 9/2018 |
| WO | 2018198092 A1 | 11/2018 |

OTHER PUBLICATIONS

Notice of Allowance for U.S. Appl. No. 16/474,072, mailed Jul. 1, 2021, 11 pages.
Author Unknown, "Technical Specification Group Radio Access Network; Evolved Universal Terrestrial Radio Access (E-UTRA);

(56) References Cited

OTHER PUBLICATIONS

Multiplexing and channel coding (Release 12)," Technical Specification 36.212, Version 12.6.0, 3GPP Organizational Partners, Sep. 2015, 95 pages.
Author Unknown, "Technical Specification Group Radio Access Network; Evolved Universal Terrestrial Radio Access (E-UTRA); Physical layer procedures (Release 12)," Technical Specification 36.213, Version 12.3.0, 3GPP Organizational Partners, Sep. 2014, 212 pages.
Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.1.0, 3GPP Organizational Partners, Mar. 2014, 57 pages.
Cuevas, Roberto, et al., "Uplink Ultra-Reliable low latency communications assessment in unlicenced spectrum," Globecom Workshops, Feb. 2019, 6 pages.
Ericsson, et al., "R1-163508: MCS Table for Initial Partial TTI in LAA," Third Generation Partnership Project (3GPP), TSG-RAN WG1 #84bis, Apr. 11-15, 2016, 4 pages, Busan, Korea.
Ericsson, "A solution for RLF in CP NB-IoT", 3GPP TSG-SA WG2 Meeting #86, S3-170254, Feb. 6-10, 2017.
Huawei, et al., "R1-1700420: Discussion on usage of mini-slot in unlicensed band below 6GHZ," Third Generation Partnership Project (3GPP), TSG RAN WG1 Nr AdHoc Meeting, Jan. 16-20, 2017, 5 pages, Spokane, USA.
Huawei, "R4-1701085: Discussion on eLAA demodulation test," Third Generation Partnership Project (3GPP), TSG-RAN WG4 Meeting #82, Feb. 13-17, 2017, 5 pages, Athens, Greece.
Intel Corporation, "R1-1704682: On the multiple uplink starting and ending positions for FS3," Third Generation Partnership Project (3GPP), TSG RAN WG1 Meeting #88bis, Apr. 3-7, 2017, 6 pages, Spokane, USA.
Maldonado, Roberto, et al., "Latency and Reliability Analysis of Cellular Networks in Unlicensed Spectrum," IEEE Access, vol. 6, Mar. 3, 2020, 12 pages.
RAN1: "R2-1700692: Response LS to IEEE 802.11 regarding LAA," 3GPP TSG RAN WG2#97, Feb. 13-17, 2017, Athens, Greece, 13 pages.
Examination Report for European Patent Application No. 18717997.3, mailed Jun. 7, 2021, 11 pages.
Examination Report for European Patent Application No. 18717998.1, mailed Jun. 28, 2021, 12 pages.
International Search Report and Written Opinion for International Patent Application No. PCT/IB2018/052005, mailed Jun. 19, 2018, 14 pages.
International Search Report and Written Opinion for International Patent Application No. PCT/IB2018/052949, mailed Aug. 21, 2018, 17 pages.
Written Opinion for International Patent Application No. PCT/IB2018/052949, mailed Mar. 25, 2019, 17 pages.
International Preliminary Report on Patentability for International Patent Application No. PCT/IB2018/052949, mailed Jul. 10, 2019, 32 pages.
Non-Final Office Action for U.S. Appl. No. 16/484,070, mailed Sep. 25, 2020, 11 pages.
International Search Report and Written Opinion for International Patent Application No. PCT/IB2018/052006, mailed Jun. 22, 2018, 15 pages.
Non-Final Office Action for U.S. Appl. No. 16/608,950, mailed Jan. 12, 2021, 16 pages.
Final Office Action for U.S. Appl. No. 16/608,950, mailed Apr. 19, 2021, 29 pages.
Notice of Allowance and Examiner-Initiated Interview Summary for U.S. Appl. No. 16/608,950, mailed Jul. 16, 2021, 10 pages.
Intel Corporation, "R2-151102: Uplink transmission with LBT," 3GPP TSG-RAN WG2 #89bis, Apr. 20-24, 2015, Bratislava, Slovakia, 6 pages.
Samsung, "R1-160557: Discussion on multi-subframe scheduling for UL LAA," 3GPP TSG RAN WG1 Meeting #84, Feb. 15-19, 2016, St. Julian's, Malta, 2 pages.
First Office Action for Chinese Patent Application No. 2018800201613, mailed Nov. 24, 2022, 12 pages.
Decision to Grant for Chinese Patent Application No. 201880020161.3, mailed Jun. 1, 2023, 6 pages.
First Office Action for Chinese Patent Application No. 2018800201806, mailed Nov. 25, 2022, 11 pages.
Intention to Grant for European Patent Application No. 18717997.3, mailed May 15, 2023, 8 pages.
Extended European Search Report for European Patent Application No. 23180289.3, mailed Jul. 11, 2023, 13 pages.
Intention to Grant for European Patent Application No. 18717998.1, mailed Jan. 19, 2023, 8 pages.
Intention to Grant for European Patent Application No. 18723071.9, mailed Sep. 24, 2021, 5 pages.
Non-Final Office Action for U.S. Appl. No. 17/484,474, mailed Sep. 15, 2022, 10 pages.
Final Office Action for U.S. Appl. No. 17/484,474, mailed Jan. 17, 2023, 20 pages.
Notice of Allowance for U.S. Appl. No. 17/484,474, mailed Mar. 20, 2023, 10 pages.
Non-Final Office Action for U.S. Appl. No. 17/347,723, mailed Oct. 27, 2022, 5 pages.
Decision to Grant for Chinese Patent Application No. 201880020180.6, mailed Jul. 20, 2023, 6 pages.
First Office Action for Chinese Patent Application No. 201880043664.2, mailed Jan. 5, 2023, 9 pages.
Second Office Action for Chinese Patent Application No. 201880043664.2, mailed Jun. 12, 2023, 8 pages.

* cited by examiner

MULTIPLE STARTING AND ENDING POSITIONS FOR SCHEDULED OR AUTONOMOUS UPLINK TRANSMISSION IN UNLICENSED SPECTRUM

CROSS-REFERENCE TO RELATED APPLICATIONS

This application is a continuation of U.S. patent application Ser. No. 17/484,474, filed Sep. 24, 2021, which is a continuation of U.S. patent application Ser. No. 16/474,072, filed Jun. 27, 2019, now U.S. Pat. No. 11,172,505, which is a national stage application of International Patent Application No. PCT/IB2018/052006, filed Mar. 23, 2018, which claims the benefit of U.S. Provisional Patent Applications Nos. 62/476,491 and 62/476,553 filed on Mar. 24, 2017, and U.S. Provisional Patent Application No. 62/479,973 filed on Mar. 31, 2017, the respective disclosures of which are hereby incorporated by reference.

TECHNICAL FIELD

The disclosed subject matter relates generally to telecommunications. Certain embodiments relate more particularly to concepts such as Licensed-Assisted Access (LAA), LTE uplink transmissions, autonomous uplink transmission, and short transmission time interval (sTTI).

BACKGROUND

The 3GPP work on "Licensed-Assisted Access" (LAA) intends to allow LTE equipment to also operate in the unlicensed radio spectrum. Candidate bands for LTE operation in the unlicensed spectrum include 5 GHz, 3.5 GHz, etc. The unlicensed spectrum can be used as a complement to the licensed spectrum or for standalone operation.

For the case of unlicensed spectrum used as a complement to licensed spectrum, devices connect in the licensed spectrum (primary cell or PCell) and use carrier aggregation to benefit from additional transmission capacity in the unlicensed spectrum (secondary cell or SCell). A carrier aggregation (CA) framework allows aggregation of two or more carriers with the condition that at least one carrier (or frequency channel) is in the licensed spectrum and at least one carrier is in the unlicensed spectrum. In a standalone (or completely unlicensed spectrum) mode of operation, one or more carriers are selected solely in the unlicensed spectrum.

Regulatory requirements may prohibit transmissions in unlicensed spectrum without prior channel sensing, or they may impose transmission power limitations or maximum channel occupancy time. Because unlicensed spectrum is generally shared with other radios of similar or dissimilar wireless technologies, a so called listen-before-talk (LBT) method is generally applied. LBT involves sensing the medium for a pre-defined minimum amount of time and backing off if the channel is busy. Due to the centralized coordination and dependency of terminal devices on the base-station (eNB) for channel access in LTE operation and imposed LBT regulations, LTE uplink (UL) performance is especially hampered. UL transmission is becoming more and more important with user-centric applications and the need for pushing data to cloud.

Today, unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike LTE, Wi-Fi terminals can asynchronously access the medium and thus show better UL performance characteristics especially in congested network conditions.

LTE uses OFDM in the downlink and discrete Fourier transform spread (DFTS) spread orthogonal frequency division multiplexing (OFDM) (DFTS-OFDM) (also referred to as single-carrier FDMA) in the uplink. The basic LTE downlink physical resource can thus be seen as a time-frequency grid as illustrated in Figure (FIG. 1 where each resource element (RE) corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI).

The downlink subframe also contains common reference symbols, which are known to the receiver and used for coherent demodulation of e.g. the control information. A downlink system with CFI=3 OFDM symbols as control is illustrated in FIG. 3. The reference symbols shown in FIG. 3 are cell specific reference symbols (CRS) and are used to support multiple functions including fine time and frequency synchronization and channel estimation for certain transmission modes.

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the PUSCH, uplink control information in the PUCCH, and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are UE specific and are indicated by scrambling the DCI Cyclic Redundancy Check (CRC) with the UE-specific C-RNTI identifier. A unique C-RNTI is assigned by a cell to every UE associated with it, and can take values in the range 0001-FFF3 in hexadecimal format. A UE uses the same C-RNTI on all serving cells.

Scheduled LTE Uplink Scheme

In LTE the uplink access is typically controlled by eNB, i.e., scheduled. In this case the UE would report to the eNB when data is available to be transmitted, e.g., by sending a scheduling request message (SR). Based on this, the eNB would grant the resources and relevant information to the UE in order to carry out the transmission of a certain size of data. The assigned resources are not necessarily sufficient for the UE to transmit all the available data. Therefore, it is possible that the UE sends a buffer status report (BSR) control message in the granted resources, in order to inform the eNB about the correct size and updated size of the data waiting for transmission. Based on that, the eNB would further grant the resources to carry on with the UE uplink transmission of the corrected size of data.

In more detail, every time new data arrives at the UE's empty buffer, the following procedure is typically performed:
   a. Using Physical Uplink Control Channel (PUCCH), the UE informs the network that it needs to transmit data by sending a Scheduling Request (SR) indicating that it needs uplink access. UE has aperiodic timeslots for SR transmissions (typically on a 5, 10, or 20 ms interval).
   b. Once the eNB receives the SR request bit, it responds with a small "uplink grant" that is just large enough to communicate the size of the pending buffer. The reaction to this request typically takes 3 ms.
   c. After the UE receives and processes (takes about 3 ms) its first uplink grant, it typically sends a Buffer Status Report (BSR) that is a MAC Control Element (MAC CE) used to provide information about the amount of pending data in the uplink buffer of the UE. If the grant is big enough, the UE sends data from its buffer within this transmission as well. Whether the BSR is sent depends also on conditions specified in 3GPP TS 36.321.
   d. The eNB receives the BSR message, allocates the necessary uplink resources and sends back another uplink grant that will allow the device to drain its buffer.

Adding it all up, about 16 ms (+time to wait for PUCCH transmission opportunity) of delay can be expected between data arrival at the empty buffer in the UE and reception of this data in the eNB.

In case the UE is not RRC connected in LTE or lost its uplink synchronization since it did not transmit or receive anything for a certain time, the UE would use the random access procedure to connect to the network, obtain synchronization and also send the SR. If this is the case the procedure until the data can be sent would take even longer than the SR transmission on PUCCH.

Downlink Control Information (DCI) for Scheduling LTE Uplink Transmission

In the LTE system, the transmission formats and parameters are controlled by the eNB. Such downlink control information (DCI) typically contains:
   Resources allocated for UL transmission (including whether frequency hopping is applied).
   Modulation and coding scheme
   Redundancy versions
   New data indicator
   Transmit power control command
   Information about demodulation reference symbol (DMRS)
   In case of cross-carrier scheduling, the target carrier index is also included.
   Other applicable control information on UL transmissions The DCI is first protected by 16-bit CRC. The CRC bits are further scrambled by the UE assigned identity (C-RNTI). The DCI and scrambled CRC bits are further protected by convolutional coding. The encoded bits are transmitted from the eNB to UE using either PDCCH or EPDCCH.

Configuration of Special Subframe

Special subframe is defined for frame structure 2 for LTE and the configuration is illustrated by the following Table 1.

TABLE 1

| | Configuration of special subframe (lengths of DwPTS/GP/UpPTS) | | | | | |
|---|---|---|---|---|---|---|
| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Licensed-Assisted Access (LAA) to Unlicensed Spectrum Using LTE

Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 5, a UE is connected to a PCell in the licensed band and one or more SCells in the unlicensed band. In this description we denote a secondary cell in unlicensed spectrum as licensed-assisted access secondary cell (LAA SCell). In the case of standalone operation as in MulteFire, no licensed cell is available for uplink control signal transmissions.

Unscheduled Uplink for LAA/MulteFire

For LTE UL channel access, both UE and eNB need to perform LBT operations corresponding to the scheduling request, scheduling grant and data transmission phases. In contrast, Wi-Fi terminals only need to perform LBT once in the UL data transmission phase. Moreover, Wi-Fi terminals can asynchronously send data compared to the synchronized LTE system. Thus, Wi-Fi terminals have a natural advantage over LTE terminals in UL data transmission, and show superior performance in collocated deployment scenarios as seen in our simulation studies. Overall study results show that Wi-Fi has better uplink performance than LTE particularly in low-load or less congested network conditions. As network congestion or load increases, the LTE channel access mechanism (TDMA type) becomes more efficient, but Wi-Fi uplink performance is still superior.

In systems described in U.S. Provisional Patent Application No. 62/326,292 and International Patent Application No. PCT/EP2016/062342, two different uplink concepts for LTE/LAA/MulteFire are proposed to increase the flexibility and the performance of Uplink. In U.S. Provisional Patent Application No. 62/326,292, similar to Wi-Fi behavior, a UE can start the UL transmission without waiting for permission from the eNB. In other words, a UE can perform LBT to gain UL channel access whenever the UL data arrives without transmitting SR or having an UL grant from the eNB. The UE can use the unscheduled mode for the whole data transmission or alternatively, transmits using unscheduled mode for first N transmission bursts and then switches back to the eNB controlled scheduling mode. In International Patent Application No. PCT/EP2016/062342, semi-persistent scheduling (SPS) grants with granted periodicity down to 1 ms are proposed to achieve similar behavior as autonomous uplink. With periodicity of 1 ms, a UE can attempt to transmit every subframe for the whole granted period.

SUMMARY

In certain embodiments of the disclosed subject matter, methods are provided for supporting multiple starting and ending positions for scheduled or autonomous UL transmission on unlicensed spectrum. Thus, UE has flexibility to transmit UL at different starting positions based on LBT outcome.

One option is to define multiple starting/ending positions and rate match the transmission based on available REs for a certain starting/ending position. Another option is to adopt sTTI design on unlicensed spectrum.

Certain embodiments can be applied to LAA/NR-U/MulteFire or other technologies operating scheduled or autonomous UL transmission on unlicensed spectrum.

Certain embodiments are presented in recognition of shortcomings associated with conventional techniques and technologies, such as the following examples. In LAA, scheduled UL on unlicensed spectrum follows eNB scheduling regarding the starting and ending positions of an UL transmission. The UE performs LBT before transmitting UL data. If LBT fails at the scheduled transmission starting point, UE will drop the transmission and eNB treat it as NACK and schedule a retransmission later on. This leads to delay of UL transmission and impact the UL performance. Also in LAA, autonomous UL transmission on unlicensed spectrum has fixed starting point for each subframe. The UE performs LBT before transmitting UL data. If LBT fails at the starting point, the UE will drop the transmission for the subframe. This also leads to the delay of UL transmission and impact the UL performance.

Certain embodiments may provide potential benefits compared to conventional techniques and technologies, such as the following examples.

Support of multiple starting positions for flexible and efficient channel access on unlicensed spectrum Reduce UL transmission delay and increase the overall system performance Enable efficient UL scheduling and transmission when multiple starting/ending positions is supported.

In some embodiments of the disclosed subject matter, a method of operating a wireless communication device comprises identifying a first start position for performing uplink (UL) transmission in unlicensed spectrum during a first transmission time interval (TTI), performing UL transmission in the first TTI according to the first start position, identifying a second start position for performing UL transmission in unlicensed spectrum during a second TTI, wherein the first and second start positions correspond to different symbol offsets within the respective first and second TTIs, and performing UL transmission in the second TTI according to the second start position.

In certain embodiments, a symbol offset for the first start position corresponds to a symbol 0, and a symbol offset for the second start position corresponds to a symbol 7.

In certain related embodiments, identifying the first start position comprises performing a first listen-before-talk (LBT) procedure, and selecting the first start position in response to a success of the first LBT procedure, and identifying the second start position comprises performing a second LBT procedure, and selecting the second start position as a consequence of a failure of the second LBT procedure.

In certain related embodiments, identifying the second start position comprises receiving an UL grant indicating that a symbol offset for the second start position corresponds to a symbol 7. In some such embodiments, the method further comprises rate matching the UL transmission to be performed in the second TTI based on available resource elements (REs) for the second start position.

In certain related embodiments, the method further comprises identifying a first end position for performing the UL transmission the first TTI, performing the UL transmission in the first TTI according to the first end position, identifying a second end position for performing the UL transmission the second TTI, wherein the first and second end positions correspond to different symbol offsets within the respective first and second TTIs, and performing the UL transmission in the second TTI according to the second end position. In some such embodiments, identifying the first end position comprises receiving an UL grant indicating the first end position.

In certain related embodiments, the first TTI is a short TTI (sTTI) and the second TTI is a full-subframe or multi-subframe TTI. In some such embodiments, the sTTI is a 7-symbol based sTTI or a 2-symbol based sTTI.

In certain related embodiments, the method further comprises selecting different modulation and coding schemes (MCSs) for the UL transmissions in the first and second TTIs according to the respective first and second start positions. In some such embodiments, the second start position has a larger symbol offset than the first start position, and the selected MCS for the UL transmission in the second TTI has a higher modulation order than the selected MCS for the UL transmission in the first TTI.

In some embodiments of the disclosed subject matter, a method of operating a wireless communication device comprises identifying multiple candidate start positions and end positions for uplink (UL) transmission in unlicensed spectrum, selecting start and end positions from among the candidates, based on an outcome of a listen-before-talk (LBT) procedure performed with respect to the unlicensed spectrum, and performing UL transmission in the unlicensed spectrum using the selected start and end positions.

In certain related embodiments, the selecting comprises determining that at least one initial LBT attempt fails and at least one subsequent LBT attempt succeeds, and selecting start and end positions that corresponds to the at least one subsequent LBT attempt.

In certain related embodiments, the selecting comprises determining that at least one initial LBT attempt fails, and declining to select start and end positions that correspond to the at least one initial LBT attempt.

In certain related embodiments, the method further comprises rate matching the UL transmission based on available resource elements (REs) for the selected start and end positions.

In certain related embodiments, the candidate start and end positions for UL transmission are defined in relation to a normal transmission time interval (TTI).

In certain related embodiments, the candidate start and end positions for UL transmission are defined in relation to a short transmission time interval (sTTI).

In certain related embodiments, the start and end positions follow UpPTS positions defined for special subframe configuration for Frame structure 2 in LTE.

In certain related embodiments, the outcome of the LBT procedure comprises a successful LBT attempt in which the wireless communication device gains access to a communication channel in the unlicensed spectrum.

In certain related embodiments, the method further comprises performing the LBT procedure.

In certain related embodiments, the method further comprises receiving radio resource control (RRC) signaling that indicates the use of a multiple starting/ending position mode, and identifying the candidate start and end positions as a consequence of receiving the RRC signaling.

In certain related embodiments, the method further comprises selecting a modulation and coding schemes (MCS) for the UL transmission according to the selected start and end positions.

In some embodiments of the disclosed subject matter, a method of operating a radio access node comprises identifying a first start position for an uplink (UL) transmission performed in unlicensed spectrum during a first transmission time interval (TTI), receiving the UL transmission in the first TTI according to the first start position, identifying a second start position for an UL transmission performed in unlicensed spectrum during a second TTI, wherein the first and second start positions correspond to different symbol offsets within the respective first and second TTIs, and receiving the UL transmission in the second TTI according to the second start position.

In certain related embodiments, a symbol offset for the first start position corresponds to a symbol 0, and a symbol offset of the second start position corresponds to a symbol 7.

In certain related embodiments, the first start position is identified in response to a first listen-before-talk (LBT) procedure successfully gaining access to a communication channel, and the second start position is identified in response to a second LBT procedure failing to gain access to the communication channel.

In certain related embodiments, the method further comprises transmitting an UL grant to a user equipment (UE) to indicate that a symbol offset for the second start position corresponds to a symbol 7.

In certain related embodiments, the method further comprises identifying a first end position for the UL transmission the first TTI, receiving the UL transmission in the first TTI according to the first end position, identifying a second end position for the UL transmission the second TTI, wherein the first and second end positions correspond to different symbol offsets within the respective first and second TTIs, and receiving the UL transmission in the second TTI according to the second end position. In some such embodiments, the method further comprises transmitting an UL grant indicating the first end position to a user equipment (UE). In some such embodiments, the first TTI is a short TTI (sTTI) and the second TTI is a full-subframe or multi-subframe TTI. The sTTI could be e.g. a 7-symbol based sTTI or a 2-symbol based sTTI.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

The disclosed subject matter provides, among other things, methods and apparatuses to support multiple starting and ending positions for scheduled or autonomous UL transmission on unlicensed spectrum. The following description presents various embodiments in relation to LAA operation as an example. However, the described concepts can also be applied to LAA/NR-U/Multefire or other technologies performing scheduled or autonomous UL transmission on unlicensed spectrum.

Aspect 1: Multiple Starting/Ending Positions

Figure 6:
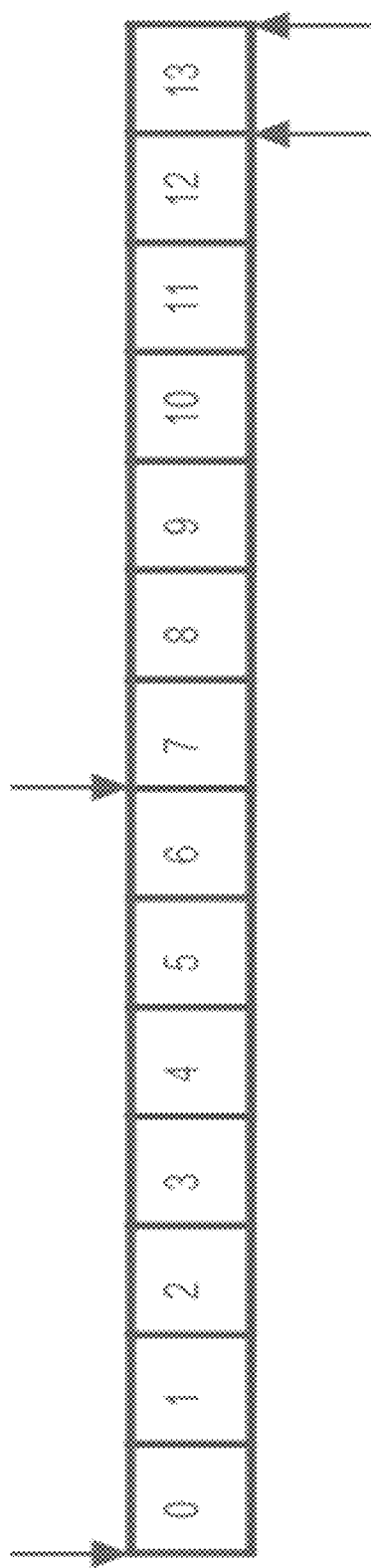
FIG. 6 illustrates multiple starting and ending positions for UL.

In some embodiments, multiple starting and ending positions for UL transmission on unlicensed spectrum are defined by eNB. A UE can start the UL transmission on one of the defined starting positions. One example is shown in FIG. 6, where two starting positions on symbol 0 and 7 and two ending positions on symbol 12 and 13 are defined for LTE UL. The UE can start the UL transmission on either symbol 0 or symbol 7 depending on LBT outcome. If LBT fails on symbol 0, the UE will continue sensing the channel and transmit on symbol 7 if LBT succeeds there. In one other example, starting and ending positions of UL transmission follows the UpPTS positions defined for special subframe configuration for Frame structure 2 in LTE.

The starting partial subframe for UL should be applied only for the first UL subframe in an UL transmission burst. This also applies for the first UL subframe sharing a maximum channel occupancy time (MCOT) with DL transmission. The subsequent subframes shall use the whole subframe for transmission.

In one example, the cell/carrier operating on unlicensed spectrum can be configured with "multiple starting/ending position mode" by eNB using RRC signaling, indicating that UL transmission can start/end at different positions and the UE has the flexibility to transmit UL on one of the configured positions. In another example, an eNB signals one of the starting positions in Table 2 in UL grant in addition to RRC configured starting positions (i.e. symbol 0 and 7 in the example). If UE transmits UL around symbol 0, the upper table applies and if UE transmits UL around symbol 7, the following Table 2 applies.

TABLE 1

| PUSCH starting position signaled in UL grant | |
|---|---|
| Value | PUSCH starting position around symbol 0 |
| 00 | symbol 0 |
| 01 | 25 μs in symbol 0 |
| 10 | (25 + TA) μs in symbol 0 |
| 11 | symbol 1 |
| Value | PUSCH starting position around symbol 7 |
| 00 | symbol 7 |
| 01 | 25 μs in symbol 7 |
| 10 | (25 + TA) μs in symbol 7 |
| 11 | symbol 8 |

The eNB performs scheduling and link adaptation assuming a full subframe transmission although UL transmission can start on other positions than subframe boundary. The UE rate matches the transport block size (TBS) to available REs based on the starting and ending position. Consequently, the code rate can be high if the starting positions is late in a subframe. To eliminate this, new modulation and coding scheme (MCS) entries can be introduced for an UL MCS table for partial starting subframe. One principle is that UE uses a higher modulation order to decrease the code rate, similar to a DL partial subframe design for LAA provided in 3GPP R1-163508. When transmitting partial starting subframe using less than 13 symbols in UL, the new MCS entries shall be used.

In certain variations of aspect 1 for autonomous UL transmission, an eNB defines multiple starting and ending positions for UL transmission on unlicensed spectrum, such as those illustrated in FIG. 6. A set of supported starting and ending positions is configured when the eNB activates autonomous UL transmission, and the UE can start the UL transmission autonomously on one of the configured starting positions based on LBT outcome. For instance, the UE can start the UL transmission on either symbol 0 or symbol 7 depending on LBT outcome. If LBT fails on symbol 0, UE continues sensing the channel and transmit on symbol 7 if LBT succeeds there. In another example, starting and ending positions of UL transmission follows the UpPTS positions defined for special subframe configuration for Frame structure 2 in LTE. In a further example, starting and ending positions of UL transmission follows sTTI pattern. In another example, the autonomous transmission always starts with a reference symbol to mark the start of the transmission at the boundary of any or subset of the DFTS-OFDM symbols within a subframe.

The starting partial subframe for UL is applied only for the first UL subframe in a UL transmission burst. The subsequent subframes use the whole subframe for transmission. The eNB performs scheduling assuming a full subframe transmission although UL transmission can start on other positions than subframe boundary. The UE rate matches the TBS to available REs based on the starting and ending position. New MCS entries can be introduced for UL MCS table for partial starting subframe. The starting and ending positions of autonomous UL transmission can be transmitted together with PUSCH data from UE to eNB.

The configuration of starting points may be performed according to e.g. one or more of the following:

The same configuration used for scheduled transmission is applicable to autonomous transmission without further autonomous UL specific configuration.

eNB configures the starting point for scheduled and autonomous separately. As a non-limiting example, the eNB can configure the starting point for autonomous later than scheduled transmission to provide some priority for scheduled transmission.

The starting point is signaled via a common or broadcast signal. In one embodiment, the starting point is signaled in the common PDCCH.

Assuming that the autonomous UL is enabled using SPS framework, the eNB can configure and activate the starting points as part of the SPS configuration via higher layer signaling (RRC).

The eNB configures the starting points as part of the SPS configuration via higher layer signaling (RRC) and activates all or subset of the starting points via SPS activation on (e)PDCCH.

Figure 7:
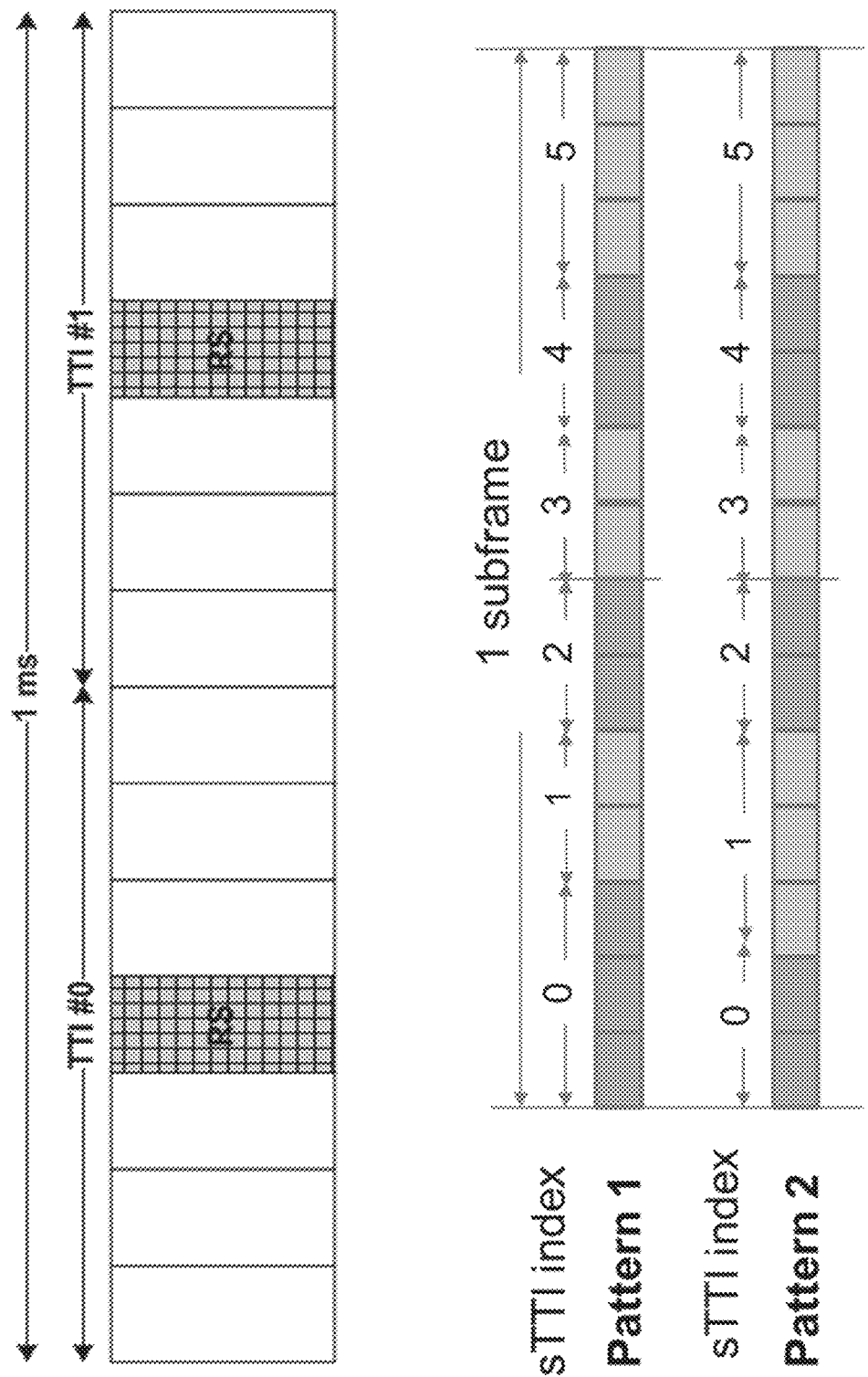
FIG. 7 illustrates examples of sTTI pattern.

Aspect 2: sTTI for UL Transmission on Unlicensed Spectrum sTTI can be adopted on unlicensed spectrum to facilitate multiple starting/ending positions for efficient channel access and data transmission. Examples of sTTI can be 7-symbol based and 2-symbol based. Examples of sTTI patterns are shown in FIG. 7.

In one embodiment, an eNB schedule sTTIs for all UL subframes in a transmission burst on LAA SCell.

In another embodiment, an eNB schedules the first UL transmission in a transmission burst to use sTTIs and subsequent subframes to use full subframe scheduling. It can be achieved by using single or multi subframe/TTI scheduling. Besides, both self-carrier scheduling or cross carrier scheduling can be used.

As one option, the same DCI OB from release 14 can be used to schedule multiple subframes that may include sTTI. The UE is configured to use sTTI in the first UL subframe of the burst. Given that, the MCS, frequency resource allocation, and other fields of the DCI applies to both the sTTIs in the first UL subframe and the subsequent subframes in the burst.

Figure 8:
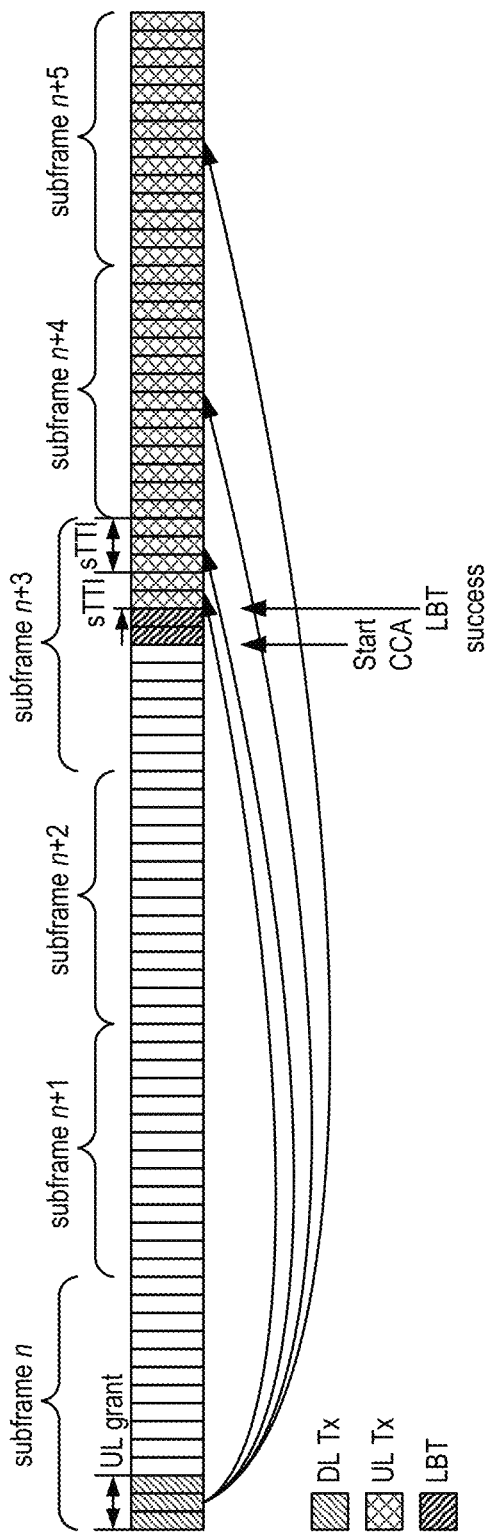
FIG. 8 illustrates examples of sTTI for LAA UL.

An example is illustrated in FIG. 8. UE performs LBT and follows UL grant for transmission. If the UE gets the channel on first scheduled subframe, it starts UL transmission using sTTI on the configured sTTI starting positions (on subframe n+3 in the example) and then full subframe transmissions (for subframe n+4 and n+5 in the example). If the UE doesn't get channel on first scheduled subframe, it shall then use full subframe transmission with fixed starting point for subsequent subframes as scheduled by eNB and transmit UL when it gets channel.

As another aspect of the embodiment, if the UE does not get channel on the first scheduled subframe, it shall attempt to transmit in the subsequent subframe based on the sTTI configuration. This means that the usage of sTTI is not linked to the first scheduled subframe, instead the UE keeps using sTTI until the LBT succeeds then switch to full subframe transmissions for the remaining of the scheduled UL burst.

In yet another embodiment, the sTTI transmissions on LAA Scell are granted using a new sDCI formats. One format can be used for single sTTI scheduling and another for multi-sTTI scheduling. The new sDCI formats include all or subset of the following:

Resource allocations based on Type 3 that is specified for LAA.
    Channel Access Priority Class
    Channel Access type
    PUSCH starting position
    PUSCH ending symbol Additionally, the multi-sTTI scheduling sDCI includes number of scheduled sTTIs or subframes.

In a further embodiment, an eNB schedules the first UL transmission in a transmission burst to use sTTIs and subsequent subframes to use aspect 1 as described above. More specifically, subsequent subframes also have multiple starting positions configured by RRC. If UE gets channel on the first subframe, it uses sTTI for first subframe and then full subframe transmission for subsequent subframes. If UE gets channel after the first subframe, it transmits on one of the RRC configured starting positions based on LBT outcome.

Figure 9:
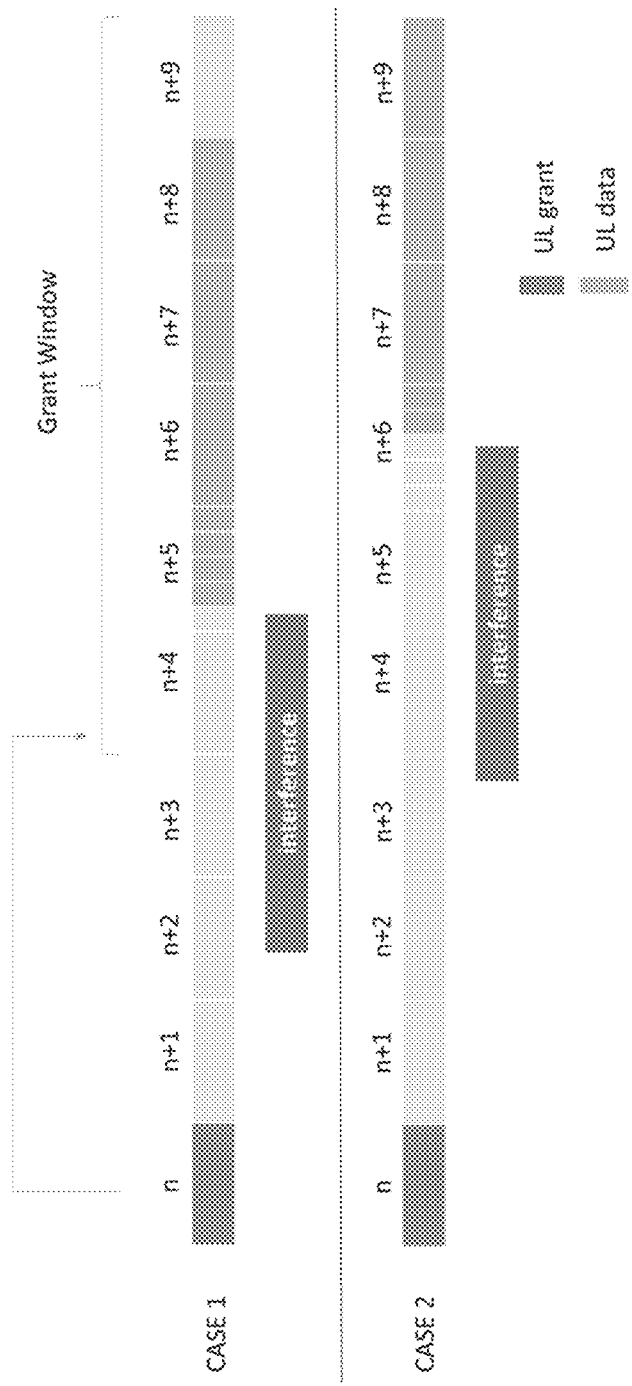
FIG. 9 illustrates scheduling without a fixed time relationship between grant and UL transmission.

To enable more flexibility, the eNB may schedule a UE without a fixed time relationship between grant and UL transmission. The granted resources are valid for a certain window of time. Otherwise, the UE does not transmit and drops the grant. The first one or more subframes in the UL burst is scheduled based on sTTI to enable multiple start points and the later subframes are according to the full subframe transmissions. The UE can start preparing the resources at an earlier time, but cannot start the UL transmission unless it is triggered. The trigger in this case is the LBT success. Unlike the previous embodiment, in this case, the UE has the flexibility to always start the UL transmission with sTTI. FIG. 9 shows the behavior in 2 different interference situations. The eNB schedule UE for 4 subframes. The lower edge of the window in which the grant is valid is n+4 and the higher edge is n+9. If the UE does not get the channel before n+9, the UE drops the grant. The UE case the flexibility to start the UL burst using sTTI in any subframe within the grant window.

In certain other embodiments, an eNB sends two copies of grants for the same subframe, one based on sTTI and one based on full subframe configuration. UE performs UL LBT and decides on which grant to follow when transmitting UL data depending on LBT outcome.

In another embodiment, both aspects 1 and 2 above are supported. An eNB configures aspect 1 when large packet of data needs to be transmitted expanding several subframes. An eNB configures aspect 2 for small packet transmission. In one example, the selection of an aspect is done via RRC signaling. In another example, the selection of is done more dynamically or flexibly, e.g., using an UL grant.

sTTI can also be adopted for autonomous UL transmission on unlicensed spectrum. Examples of sTTI can be 7-symbol based and 2-symbol based, such as those illustrated in FIG. 7.

In one embodiment, eNB schedules autonomous UL transmission, i.e., the MCS, RB assignment and TBS selection, based on sTTI configuration and sends it to UE when activating autonomous UL. The first subframe of autonomous UL transmission follows such scheduling configuration by using the assigned MCS and TBS. For subsequent subframes where a whole subframe can be used, UE can scale up the TBS accordingly based on available REs.

In another embodiment, eNB schedules autonomous UL transmission, i.e., the MCS, RB assignment and TBS selection, based on sTTI configuration. UE follows such scheduling configuration by using the assigned MCS and TBS for all subframes.

In a further embodiment, eNB schedules autonomous UL transmission based on both sTTI configuration and full subframe configuration. Two copies of MCS, RB assignment and TBS are sent to UE. UE selects MCS, RB assignment and TBS based on starting position of autonomous UL transmission for a certain subframe. I.e., if it is partial starting subframe, the MCS/TBS based on sTTI is applied for transmission; otherwise, the MCS/TBS based on full subframe is applied for transmission.

In another embodiment, the eNB configures a UE to use sTTI configuration based on a certain frame periodicity. That is, the UE is configured with one or more subframe that can transmit autonomous UL transmission using sTTI every X subframes. Given that, the UE benefits from additional starting points only within the subframes that are configured with sTTI transmissions. In addition, it minimizes eNB blind detection efforts.

Assuming that autonomous UL is enabled using SPS framework, the eNB can enable or disable the multiple starting points depending on the DL control signaling used. For instance, to enable more starting points based on sTTI configuration, the eNB sends the SPS activation command on sPDCCH. Otherwise, if SPS command is sent on PDCCH, the UE does not transmit according to the sTTI configuration. If SPS activation is sent on both PDCCH and sPDCCH, the UE has the flexibility to transmit according to a full subframe of sTTI configuration depending on LBT outcome.

Alternatively, higher layer configuration (RRC) can be used to activate UL sTTI on SPS resources. As an example, the UE may be configured to use sTTI configuration on SPS resources based on a certain frame periodicity, for instance "X" subframes configured with sTTI every "Y" subframes. The UE can still attempt to do autonomous UL outside those subframes but not using the sTTI configuration.

Figure 1:
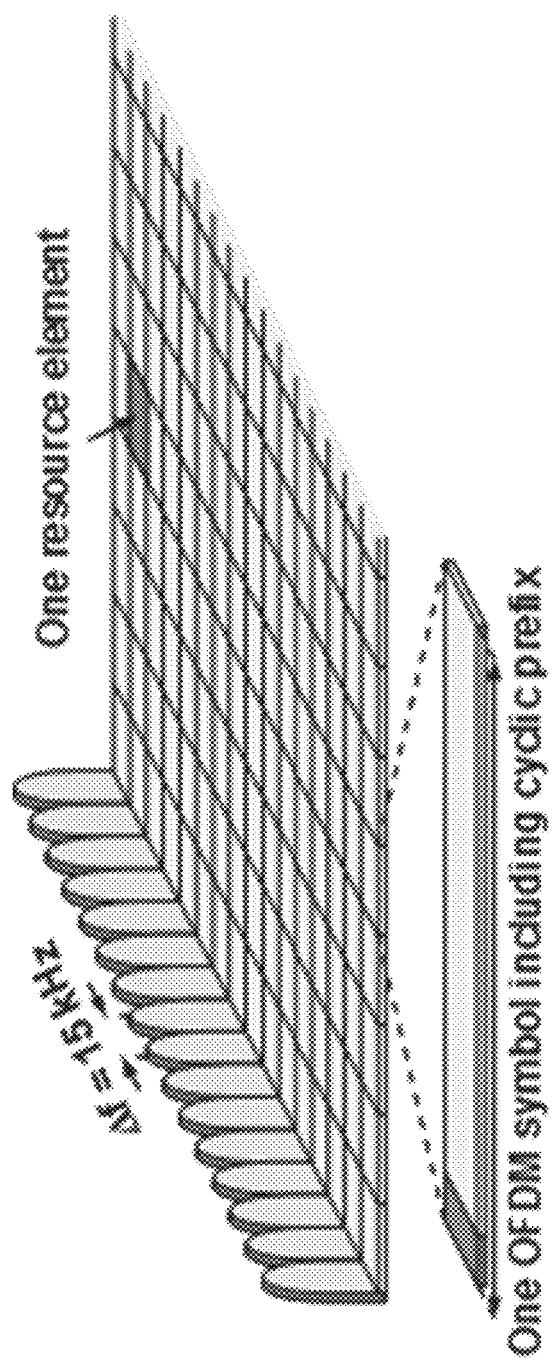
FIG. 1 illustrates an LTE downlink physical resource.

The described embodiments may be implemented in any appropriate type of communication system supporting any suitable communication standards and using any suitable components. As one example, certain embodiments may be implemented in a communication system such as that illustrated in FIG. 1. Although certain embodiments are described with respect to LTE systems and related terminology, the disclosed concepts are not limited to LTE or a 3GPP system. Additionally, although reference may be made to the term "cell", the described concepts may also apply in other contexts, such as beams used in Fifth Generation (5G) systems, for instance.

Figure 10:
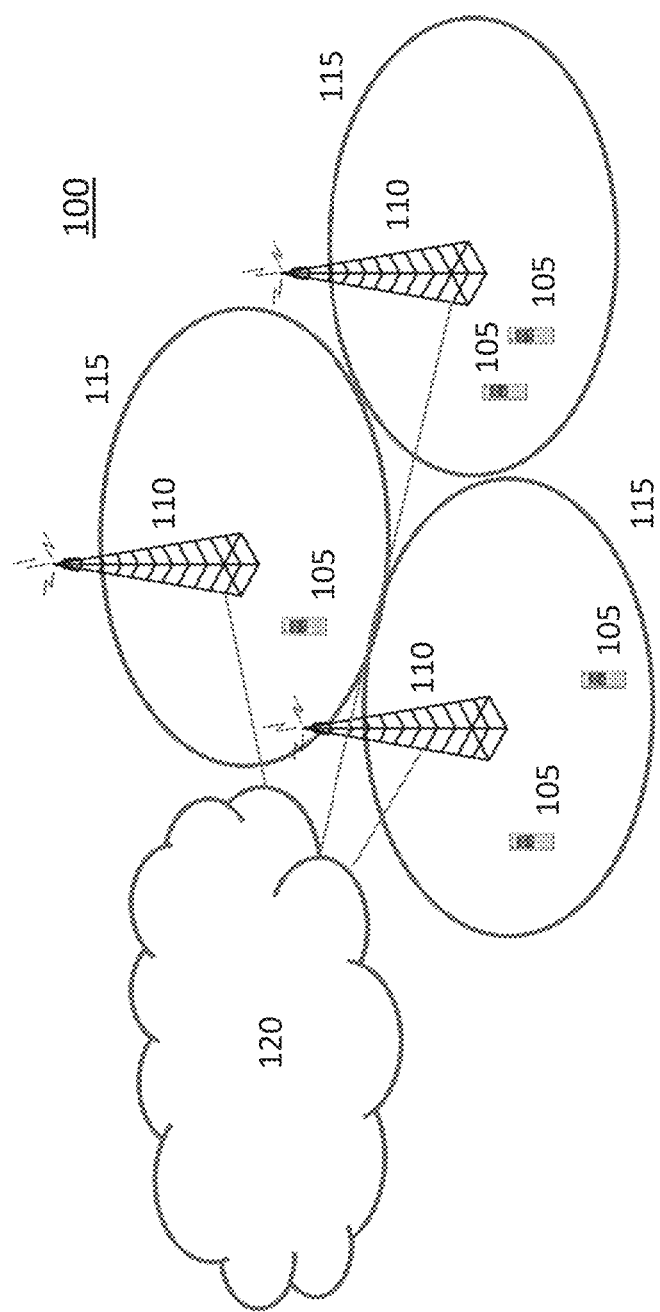
FIG. 10 illustrates a communication system according to an embodiment of the disclosed subject matter.

Referring to FIG. 10, a communication system 100 comprises a plurality of wireless communication devices 105 (e.g., UEs, machine type communication [MTC]/machine-to-machine [M2M] UEs) and a plurality of radio access nodes 110 (e.g., eNodeBs or other base stations). Communication system 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 11B:
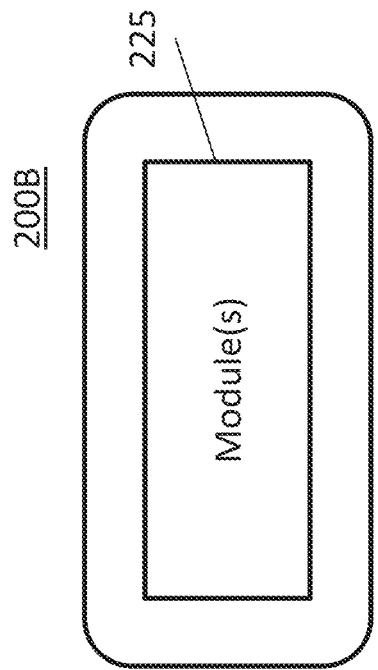
FIG. 11B illustrates a wireless communication device according to another embodiment of the disclosed subject matter.
Figure 11A:
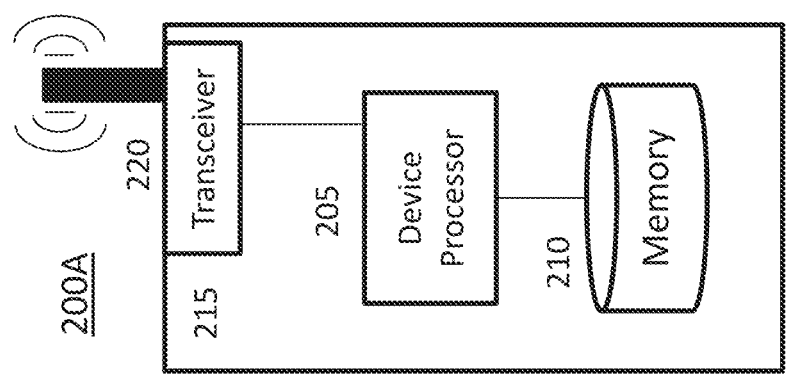
FIG. 11A illustrates a wireless communication device according to an embodiment of the disclosed subject matter.

Although wireless communication devices 105 may represent communication devices that include any suitable combination of hardware and/or software, these wireless communication devices may, in certain embodiments, represent devices such as those illustrated in greater detail by FIGS. 11A and 11B. Similarly, although the illustrated radio access node may represent network nodes that include any suitable combination of hardware and/or software, these nodes may, in particular embodiments, represent devices such those illustrated in greater detail by FIGS. 12A, 12B and 13.

Figure 2:
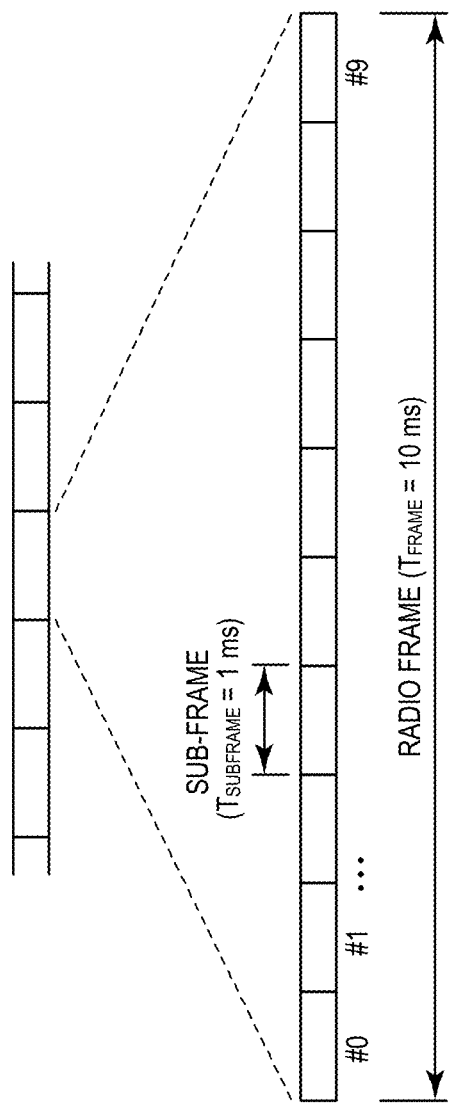
FIG. 2 illustrates an LTE time-domain structure.

Referring to FIG. 11A, a wireless communication device 200A comprises a processor 205 (e.g., Central Processing Units [CPUs], Application Specific Integrated Circuits [ASICs], Field Programmable Gate Arrays [FPGAs], and/or the like), a memory 210, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as memory 210. Alternative embodiments may include additional components beyond those shown in FIG. 2A that may be responsible for providing certain aspects of the device's functionality, including any of the functionality described herein.

Referring to FIG. 11B, a wireless communication device 200B comprises at least one module 225 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 11A.

Figure 12A:
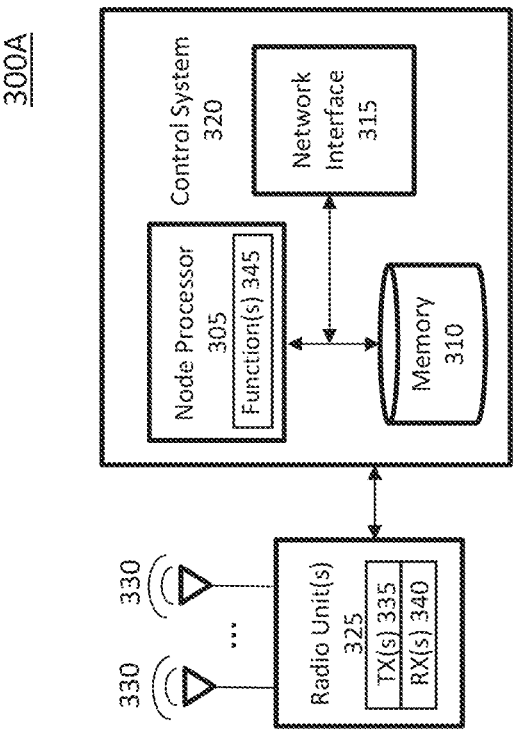
FIG. 12A illustrates a radio access node according to an embodiment of the disclosed subject matter.

Referring to FIG. 12A, a radio access node 300A comprises a control system 320 that comprises a node processor 305 (e.g., Central Processing Units (CPUs), Application Specific Integrated Circuits (ASICs), Field Programmable Gate Arrays (FPGAs), and/or the like), memory 310, and a network interface 315. In addition, radio access node 300A comprises at least one radio unit 325 comprising at least one transmitter 335 and at least one receiver coupled to at least one antenna 330. In some embodiments, radio unit 325 is external to control system 320 and connected to control system 320 via, e.g., a wired connection (e.g., an optical cable). However, in some other embodiments, radio unit 325 and potentially the antenna 330 are integrated together with control system 320. Node processor 305 operates to provide at least one function 345 of radio access node 300A as described herein. In some embodiments, the function(s) are implemented in software that is stored, e.g., in the memory 310 and executed by node processor 305.

Figure 3:
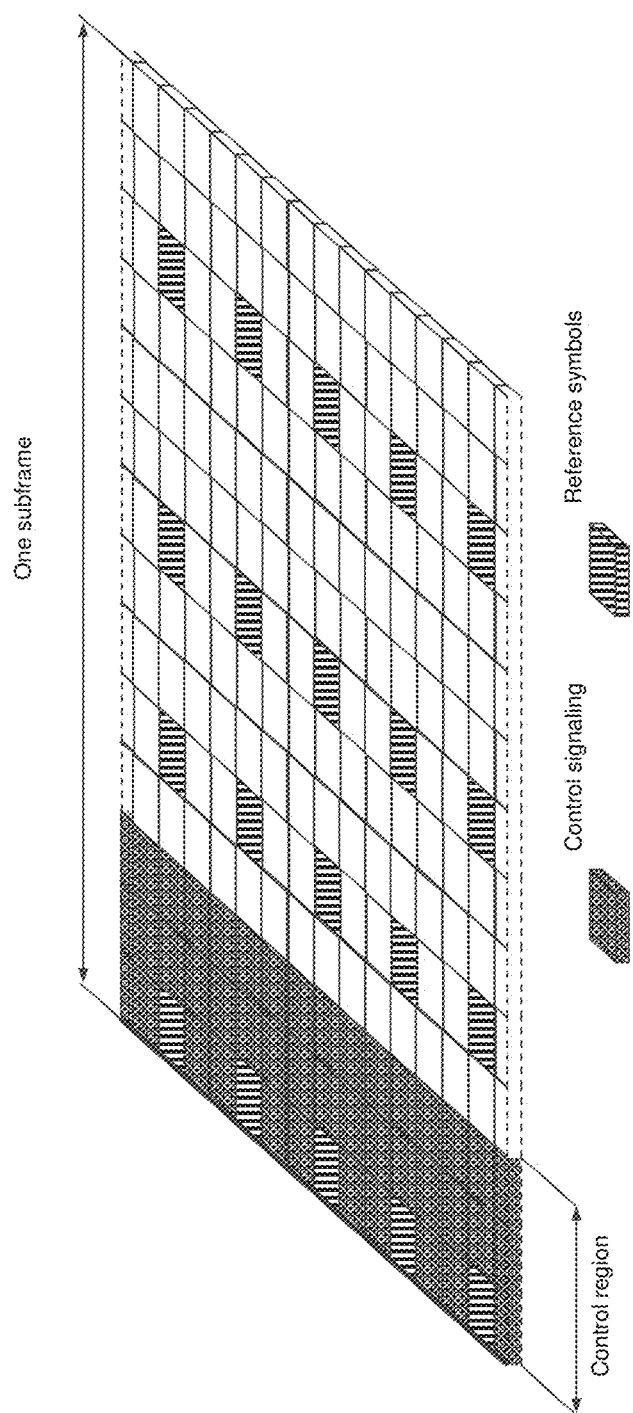
FIG. 3 illustrates a downlink subframe.

In certain embodiments, some or all of the functionality described as being provided by a base station, a node B, an enodeB, and/or any other type of network node may be provided by node processor 305 executing instructions stored on a computer-readable medium, such as memory 310 shown in FIG. 3A. Alternative embodiments of radio access node 300 may comprise additional components to provide additional functionality, such as the functionality described herein and/or related supporting functionality.

Figure 12B:
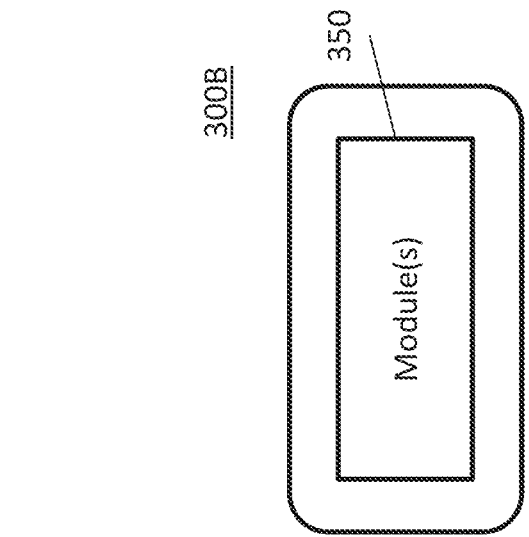
FIG. 12B illustrates a radio access node according to another embodiment of the disclosed subject matter.

Referring to FIG. 12B, a radio access node 300B comprises at least one module 350 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 12A.

Figure 4:
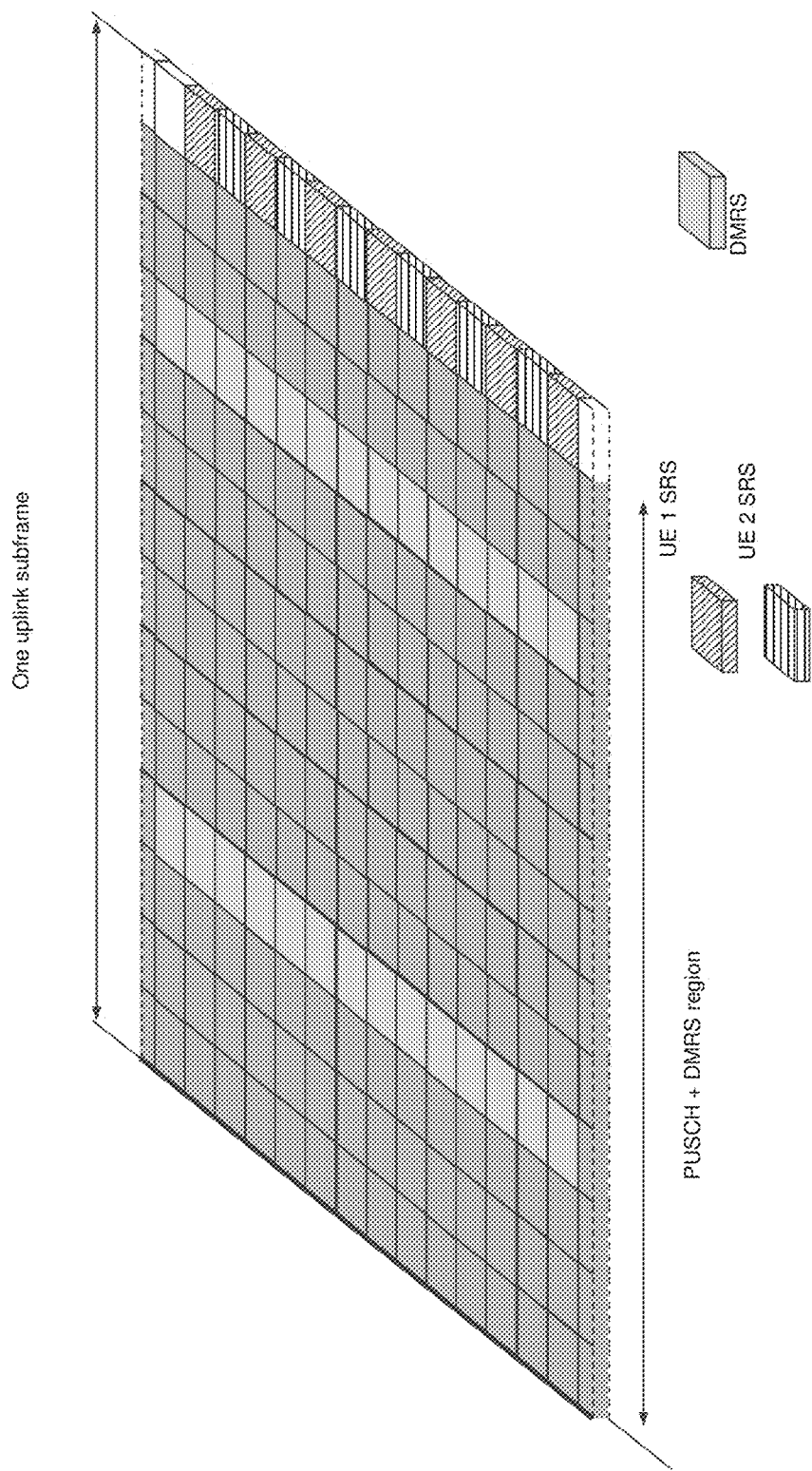
FIG. 4 illustrates an uplink subframe.
Figure 5:
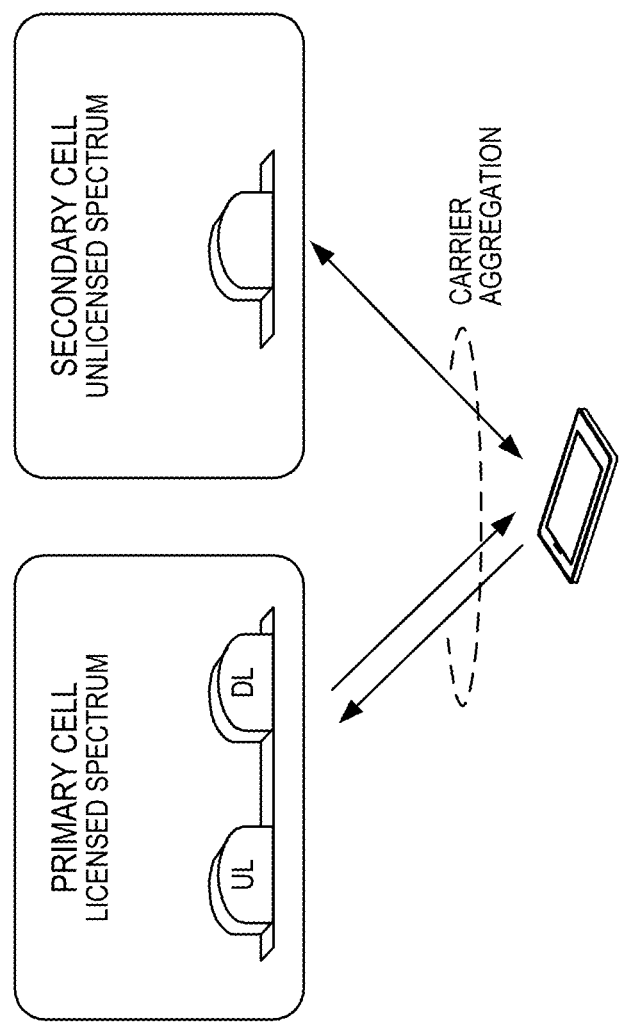
FIG. 5 illustrates licensed-assisted access (LAA) to unlicensed spectrum using LTE carrier aggregation.
Figure 13:
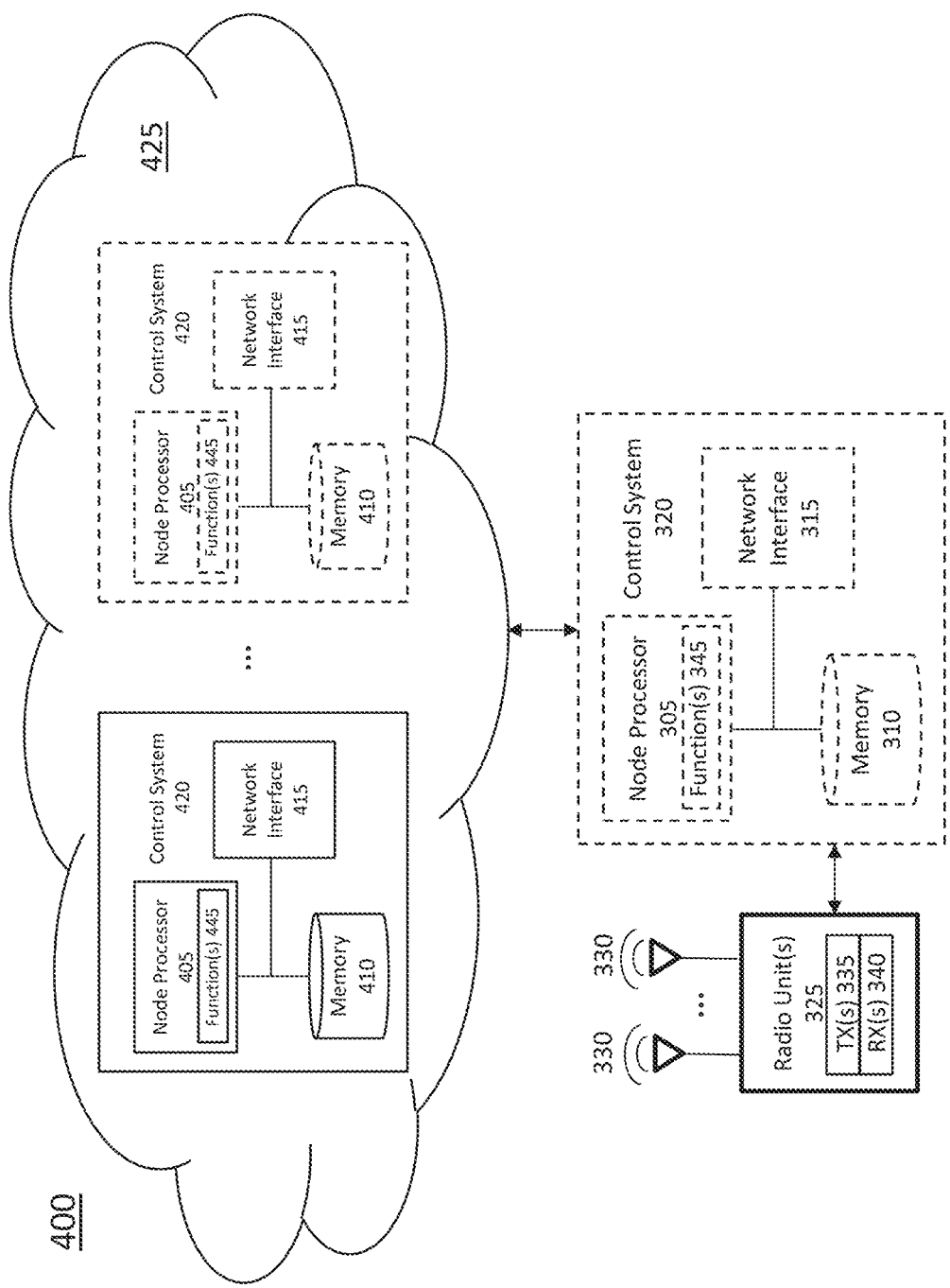
FIG. 13 illustrates a radio access node according to yet another embodiment of the disclosed subject matter.

FIG. 13 is a block diagram that illustrates a virtualized radio access node 400 according to an embodiment of the disclosed subject matter. The concepts described in relation to FIG. 4 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 13, radio access node 400 comprises control system 320 as described in relation to FIG. 12A.

Control system 320 is connected to one or more processing nodes 420 coupled to or included as part of a network(s) 425 via network interface 315. Each processing node 420 comprises one or more processors 405 (e.g., CPUs, ASICs, FPGAs, and/or the like), memory 410, and a network interface 415.

In this example, functions 345 of radio access node 300A described herein are implemented at the one or more processing nodes 420 or distributed across control system 320 and the one or more processing nodes 420 in any desired manner. In some embodiments, some or all of the functions 345 of radio access node 300A described herein are implemented as virtual components executed by one or more virtual machines implemented in a virtual environment(s) hosted by processing node(s) 420. As will be appreciated by one of ordinary skill in the art, additional signaling or communication between processing node(s) 420 and control system 320 is used in order to carry out at least some of the desired functions 345. As indicated by dotted lines, in some embodiments control system 320 may be omitted, in which case the radio unit(s) 325 communicate directly with the processing node(s) 420 via an appropriate network interface(s).

In some embodiments, a computer program comprises instructions which, when executed by at least one processor, causes at least one processor to carry out the functionality of a radio access node (e.g., radio access node 110 or 300A) or another node (e.g., processing node 420) implementing one or more of the functions of the radio access node in a virtual environment according to any of the embodiments described herein.

Figure 14:
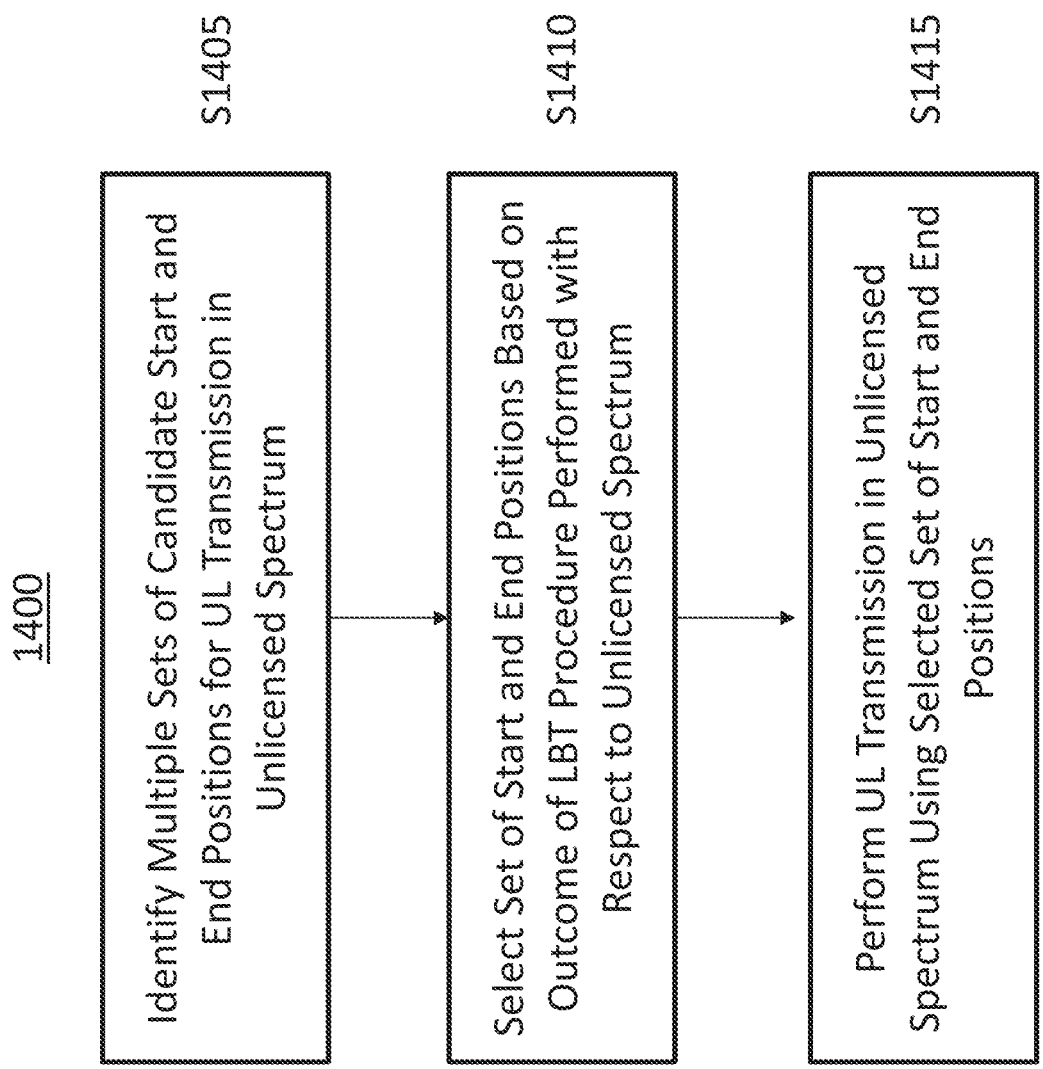
FIG. 14 illustrates a method of operating a wireless communication device according to an embodiment of the disclosed subject matter.
Figure 15:
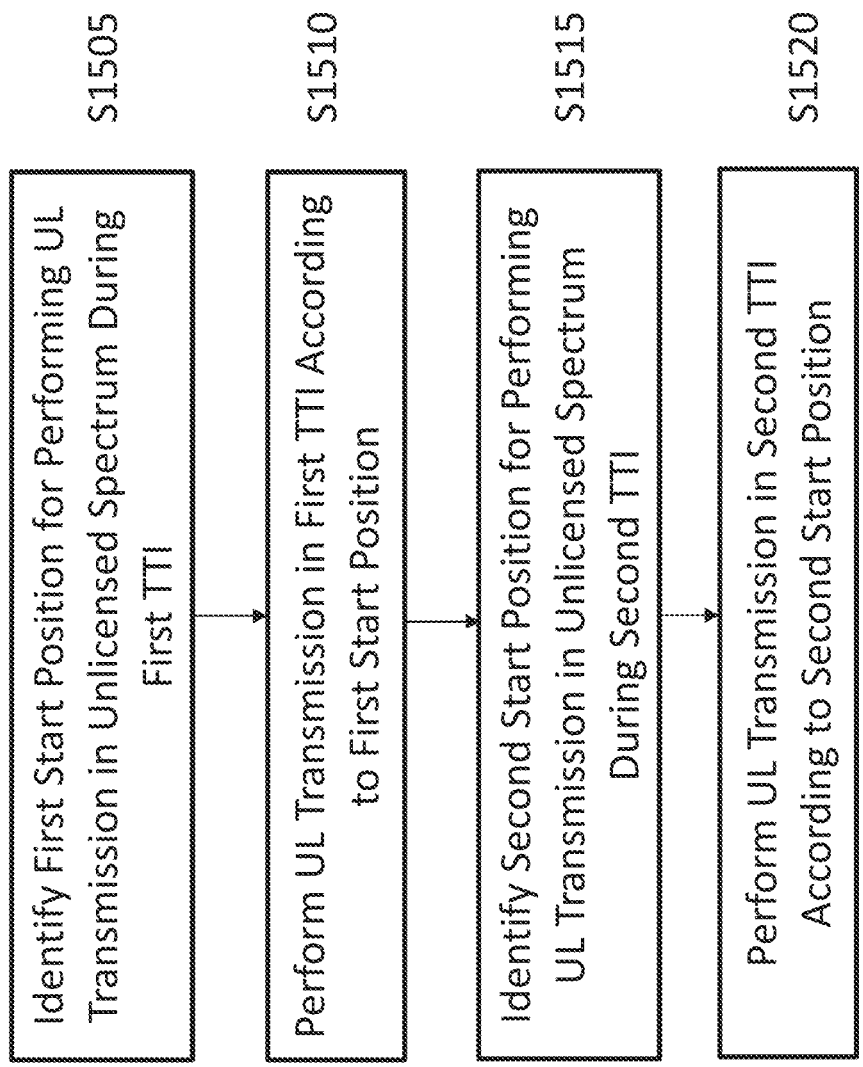
FIG. 15 illustrates a method of operating a wireless communication device according to an embodiment of the disclosed subject matter.

FIGS. 14-15 illustrate various methods of operating a wireless communication device according to embodiments of the disclosed subject matter. These methods could be performed by an apparatus such as that illustrated in any of FIGS. 10-13, for instance. Additionally, these methods could be performed in conjunction with any of various alternative features as described above, such as various alternative time transmission interval configurations, subframe configurations, timing arrangements, signaling procedures, etc.

Referring to FIG. 14, a method 1400 comprises identifying multiple sets of candidate start and end positions for uplink (UL) transmission in unlicensed spectrum (S1405), selecting at least one set of start and end positions from among the candidates, based on an outcome of a listen-before-talk (LBT) procedure performed with respect to the unlicensed spectrum (S1410), and performing UL transmission in the unlicensed spectrum using the selected at least one set of start and end positions (S1415). In this and other embodiments, the identification of multiple sets of candidate start positions may include e.g. receiving information from a radio access node, reading information from memory, etc. The selecting may be performed in any of various alternative ways as described above in relation to FIGS. 6-9, for instance. The performing of UL transmission may comprise e.g. transmitting information using defined resources as described above.

Referring to FIG. 15, a method 1500 comprises identifying a first start position for performing uplink (UL) transmission in unlicensed spectrum during a first transmission time interval (TTI) (S1505), performing UL transmission in the first TTI according to the first start position (S1510), identifying a second start position for performing UL transmission in unlicensed spectrum during a second TTI, wherein the first and second start positions correspond to different symbol offsets within the respective first and second TTIs (S1515), and performing UL transmission in the second TTI according to the second start position (S1520).

Figure 16:
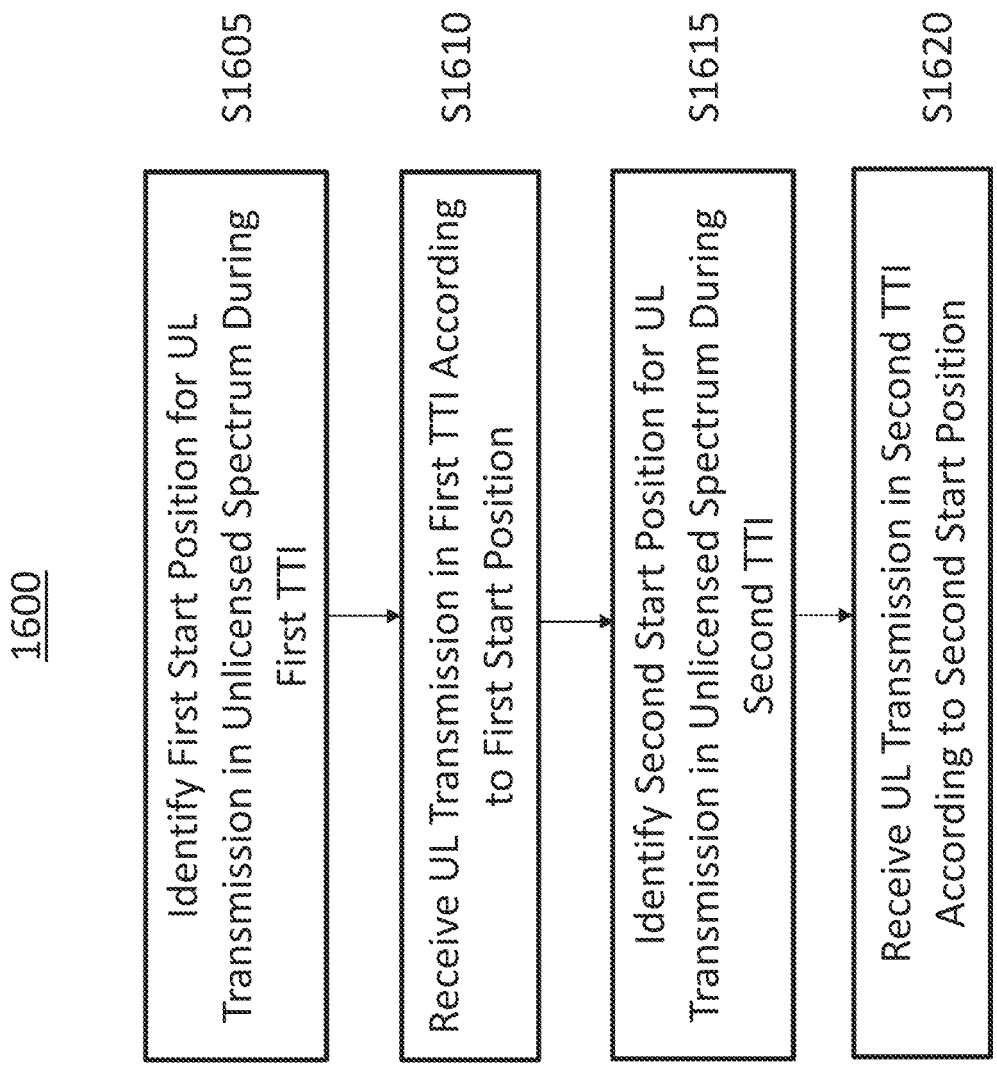
FIG. 16 illustrates a method of operating a radio access node according to an embodiment of the disclosed subject matter.

FIG. 16 illustrates a method of operating a radio access node according to an embodiment of the disclosed subject matter. This method could be performed by an apparatus such as that illustrated in any of FIG. 10, 12 or 13, for instance. Additionally, this method could be performed in conjunction with any of various alternative features as described above, such as various alternative time transmission interval configurations, subframe configurations, timing arrangements, signaling procedures, etc.

Referring to FIG. 16, a method 1600 comprises identifying a first start position for an uplink (UL) transmission performed in unlicensed spectrum during a first transmission time interval (TTI) (S1605), receiving the UL transmission in the first TTI according to the first start position (S1610), identifying a second start position for an UL transmission performed in unlicensed spectrum during a second TTI, wherein the first and second start positions correspond to different symbol offsets within the respective first and second TTIs (S1615), and receiving the UL transmission in the second TTI according to the second start position (S1620).

The following is a list of acronyms that may be used in this written description.

BSR Buffer Status Request
CC Component Carrier
CCA Clear Channel Assessment
CQI Channel Quality Information
CRC Cyclic Redundancy Check
DCI Downlink Control Information
DL Downlink
DMTC DRS Measurement Timing Configuration
DRS Discovery Reference Signal
eNB evolved NodeB, base station
UE User Equipment
UL Uplink
LAA Licensed-Assisted Access
SCell Secondary Cell
STA Station
LBT Listen-before-talk
LTE-U LTE in Unlicensed Spectrum
PDCCH Physical Downlink Control Channel
PMI Precoding Matrix Indicator
PUSCH Physical Uplink Shared Channel
RAT Radio Access Technology
RNTI Radio Network Temporary Identifier
TXOP Transmission Opportunity
UL Uplink
sTTI Shortened TTI While the disclosed subject matter has been presented above with reference to various embodiments, it will be understood that various changes in form and details may be made to the described embodiments without departing from the overall scope of the disclosed subject matter.

What is claimed is:

1. A method of operating a wireless communication device, comprising:
receiving, from a radio access node, a configuration for uplink, UL, transmission using semi-persistent scheduling, SPS, the configuration indicating that a first set of subframes comprising one or more subframes is configured with a short transmission time interval, sTTI, and the sTTI configuration is repeated periodically with a configured periodicity, wherein each subframe configured with the sTTI comprises a plurality of start positions;
performing a listen-before-talk, LBT, procedure; and
performing the UL transmission using one of the plurality of start positions for the UL transmission upon a success of the LBT procedure.

2. The method of claim 1, wherein the LBT procedure is one or more of: a first LBT procedure; and a second LBT procedure; the method further comprising:
performing a first listen-before-talk, LBT, procedure; and upon a failure of the first LBT procedure, performing the second LBT procedure; wherein: performing the UL transmission comprises performing the UL transmission using a first start position upon a success of the first LBT procedure or performing the UL transmission using a second start position upon a success of the second LBT procedure; and the first and second start positions correspond to a start of different symbols in a subframe.

3. The method of claim 2, wherein a symbol for the first start position corresponds to a symbol 0, and a symbol for the second start position corresponds to a symbol 7, when the sTTI is a 7-symbol based sTTI.

4. The method of claim 2, further comprising receiving a UL grant indicating that a symbol for the second start position corresponds to a symbol 7.

5. The method of claim 2, further comprising:
identifying a first end position for performing the UL transmission;
performing the UL transmission according to the first end position;
identifying a second end position for performing the UL transmission, wherein the first and second end positions correspond to an end of different symbols in a subframe; and
performing the UL transmission according to the second end position.

6. The method of claim 5, wherein identifying the first end position comprises receiving a UL grant indicating the first end position.

7. The method of claim 6, further comprising rate matching the UL transmission to be performed to available resource elements, REs based on the start and end position of the UL transmission.

8. The method of claim 1, wherein the sTTI is a 7-symbol based sTTI or a 2-symbol based sTTI.

9. The method of claim 1, wherein the configuration further indicates that a second set of subframes comprising one or more subframes is not configured with the sTTI, wherein the second set of subframes is outside the first set of subframes.

10. The method of claim 1, wherein the UL transmission using SPS is configured by higher layer configuration or Radio Resource Control, RRC.

11. A method of operating a radio access node, comprising:
transmitting, to a wireless communication device, a configuration for uplink, UL, transmission using semi-persistent scheduling, SPS, the configuration indicating that a first set of subframes comprising one or more subframes is configured with a short transmission time interval, sTTI, and the sTTI configuration is repeated periodically with a configured periodicity, wherein each subframe configured with the sTTI comprises a plurality of start positions; and
receiving the UL transmission at one of the plurality of start positions for the UL transmission upon a success of a listen-before-talk, LBT, procedure.

12. The method of claim 11, wherein the LBT procedure is one or more of: a first LBT procedure; and a second LBT procedure; and receiving the UL transmission comprises receiving the UL transmission starting on a first start position or receiving the UL transmission starting on a second start position;
wherein the first start position is identified in response to a the first listen-before-talk, LBT procedure at the wireless communication device successfully gaining access to a communication channel, and the second start position is identified in response to the first LBT procedure at the wireless communication device failing to gain access to the communication channel and the second LBT procedure at the wireless communication device successfully gaining access to the communication channel; and
the first and second start positions correspond to a start of different symbols in a subframe.

13. The method of claim 11, wherein the sTTI is a 7-symbol based sTTI or a 2-symbol based sTTI.

14. The method of claim 11, wherein the configuration further indicates that a second set of subframes comprising one or more subframes is not configured with the sTTI, wherein the second set of subframes is outside the first set of subframes.

15. The method of claim 11, further comprising transmitting a higher layer configuration or Radio Resource Control, RRC, for configuring the UL transmission using SPS.

16. A wireless communication device, comprising:
processing circuitry configured to:
receive, from a radio access node, a configuration for uplink, UL, transmission using semi-persistent scheduling, SPS, the configuration indicating that a first set of subframes comprising one or more subframes is configured with a short transmission time interval, sTTI and the sTTI configuration is repeated periodically with a configured periodicity, wherein each subframe configured with the sTTI comprises a plurality of start positions;
perform a listen-before-talk, LBT, procedure; and
perform the UL transmission using one of the plurality of start positions for the UL transmission upon a success of the LBT procedure.

17. The wireless device of claim 16, wherein the LBT procedure is one or more of: a first LBT procedure; and a second LBT procedure; and the processing circuitry is further configured to:
perform a first listen-before-talk, LBT, procedure; and
upon a failure of the first LBT procedure, perform the second LBT procedure;
wherein: performing the UL transmission comprises performing the UL transmission using a first start position upon a success of the first LBT procedure or performing the UL transmission using a second start position upon a success of the second LBT procedure; and the first and second start positions correspond to a start of different symbols in a subframe.

18. The wireless device of claim 16, wherein the sTTI is a 7-symbol based sTTI or a 2-symbol based sTTI.

19. The wireless device of claim 16, wherein the configuration further indicates that a second set of subframes comprising one or more subframes is not configured with the sTTI, wherein the second set of subframes is outside the first set of subframes.

20. A radio access node, comprising:
processing circuitry configured to:
  transmit, to a wireless communication device, a configuration for uplink, UL, transmission using semi-persistent scheduling, SPS, the configuration indicating that a first set of subframes comprising one or more subframes is configured with a short transmission time interval, sTTI, and the sTTI configuration is repeated periodically with a configured periodicity, wherein each subframe configured with the sTTI comprises a plurality of start positions; and
  receive the UL transmission at one of the plurality of start positions for the UL transmission upon a success of a listen-before-talk, LBT, procedure.

* * * * *